(12) United States Patent
Ahn

(10) Patent No.: US 10,953,908 B1
(45) Date of Patent: Mar. 23, 2021

(54) NON-WOVEN FABRIC TYPE STEERING WHEEL HANDS OFF DETECTION COVER

(71) Applicants: HYUNDAI MOTOR COMPANY, Seoul (KR); KIA MOTORS CORPORATION, Seoul (KR)

(72) Inventor: Hyoung-Jun Ahn, Daegu (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/848,396

(22) Filed: Apr. 14, 2020

(30) Foreign Application Priority Data

Oct. 31, 2019 (KR) .................. 10-2019-0137457

(51) Int. Cl.
```
B62D 1/04      (2006.01)
B62D 1/06      (2006.01)
C23C 18/54     (2006.01)
D06M 11/83     (2006.01)
H01B 1/22      (2006.01)
```
(52) U.S. Cl.
CPC .............. *B62D 1/046* (2013.01); *B62D 1/06* (2013.01); *C23C 18/54* (2013.01); *D06M 11/83* (2013.01); *H01B 1/22* (2013.01)

(58) Field of Classification Search
CPC ........................................... B62D 1/046
See application file for complete search history.

(56) References Cited

U.S. PATENT DOCUMENTS

| | | | |
|---|---|---|---|
| 2005/0064204 A1* | 3/2005 | Lalli | B82Y 30/00 428/428 |
| 2010/0130889 A1* | 5/2010 | Toth | G01L 9/02 600/587 |

FOREIGN PATENT DOCUMENTS

KR    20110058460 A    6/2011

* cited by examiner

*Primary Examiner* — Vicky A Johnson
(74) *Attorney, Agent, or Firm* — Lempia Summerfield Katz LLC

(57) ABSTRACT

A steering wheel hands off detection (HOD) cover may include a HOD pad having a fabric made of a non-woven fabric or a foam sponge of a non-woven fabric. A conductive plating surface of the fabric may be surface plated and on which sensing responses occur with respect to a contact state (hands ON) and a non-contact state (hands OFF) due to a physical contact.

15 Claims, 3 Drawing Sheets

NON-WOVEN FABRIC TYPE STEERING WHEEL HANDS OFF DETECTION COVER

CROSS-REFERENCE(S) TO RELATED APPLICATIONS

This application claims priority to Korean Patent Application No. 10-2019-0137457, filed on Oct. 31, 2019, which is incorporated herein by reference in its entirety.

BACKGROUND OF THE PRESENT DISCLOSURE

Field of the Present Disclosure

Embodiments of the present disclosure relate to a hands off detection (HOD) pad. More particularly, it relates to a steering wheel HOD cover with a HOD pad made of a non-woven fabric.

Description of the Related Art

Generally, an autonomous vehicle should be able to detect whether a driver's hand is placed on or touching a steering wheel. To this end, a wheel cover surrounding the steering wheel is comprised of a steering wheel hands off detection (HOD) cover with a HOD pad.

For example, the steering wheel HOD cover has a structure in which a HOD pad is bonded to front and rear sides of a polyethylene (PE) foam using an adhesive. A steering wheel leather is covered on the HOD pad or a hot wire pad is patched below the HOD pad.

Further, the HOD pad is comprised of a detector, which generates a signal by detecting or sensing an electrical signal of a conductive fiber, together with a conductive fiber that is a textile plated with nickel and copper.

Therefore, the autonomous vehicle may detect a hand lift of the driver through a signal from the HOD pad of the steering wheel HOD cover surrounding the steering wheel (for example, generation of an electrical signal from the detector) to recognize a driving intent of the driver or may detect a hand drop of the driver (for example, interruption of an electrical signal of the detector).

However, owing to application of a woven-type conductive fiber, the HOD pad causes a problem of increased process cost together with a problem of the HOD pad itself.

For example, the problem of the HOD pad itself is a lack of elongation (or an elongation rate). This is due to nickel and copper being coated on a polyester fiber strand in a plating method such that a metal coating yarn made of polyester-nickel-copper-nickel is formed as the woven-type conductive fiber in the form of a mesh (a fiber-net or a wire-net). Thus, in a process of surrounding a steering wheel grip body, the woven-type conductive fiber having low elongation does not smoothly surround the steering wheel grip body. Thus, fiber wrinkles may be formed.

Consequently, in a process of assembling a leather cover subsequent to a process of assembling the woven-type conductive fiber to the steering wheel, wrinkles are inevitably frequently formed in the leather cover.

Further, the problem of increased process cost is a change in a wheel cover assembly process. This is due to, in a process of covering the steering wheel with the HOD pad and then surrounding the steering wheel with a wheel leather cover, the need for an additional process to prevent excessive generation of surface wrinkles on the wheel leather cover. In this case, as compared to the existing process, in which the HOD pad is bonded to the steering wheel grip body and then a wheel leather cover process is performed, the additional process refers to a pad-cover bonding process of the HOD pad and the wheel leather cover.

As a result, the wheel cover assembly process can remove the surface wrinkles of the wheel leather cover by surrounding the steering wheel with the HOD pad and the wheel leather cover in a state in which the HOD pad is coupled to the wheel leather cover. However, an excessive cost increase due to a material cost of the additional process may inevitably occur.

SUMMARY OF THE PRESENT DISCLOSURE

An embodiment of the present disclosure is directed to a steering wheel hands off detection (HOD) cover. The HOD cover is capable of solving a problem of a woven-type conductive fiber having low elongation due to a metal coating yarn with high elongation by forming an HOD pad with a conductor using a conductive non-woven fabric or a foam sponge of a non-woven fabric. More particularly, the HOD cover is capable of reducing production costs due to maintenance of an assembly process because wrinkles are not formed on a surface of a leather in a process of assembling a leather cover, which is patched on the HOD pad using high elongation of the conductive non-woven fabric or the foam sponge of a non-woven fabric.

Other objects and advantages of the present disclosure can be understood by the following description and become apparent with reference to the embodiments of the present disclosure. Also, it should become apparent to those having ordinary skill in the art to which the present disclosure pertains that the objects and advantages of the present disclosure can be realized by the means as claimed and combinations thereof.

In accordance with an embodiment of the present disclosure, a steering wheel HOD cover is provided. The HOD cover includes a HOD pad having a fabric made of a non-woven fabric. A conductive plating surface of the fabric is surface plated, and on which sensing responses occur with respect to a contact state and a non-contact state as a result of physical contact.

As an embodiment, the non-woven fabric may be formed of a foam sponge of a non-woven fabric.

As an embodiment, the surface plating may be performed with nickel and copper, which may be precipitation plated on the fabric. The surface plating may be performed such that the fabric is precipitation plated in a nickel precipitator containing the nickel, precipitation plated in a copper precipitator containing the copper, and then precipitation plated in another nickel precipitator containing the nickel.

As an embodiment, the non-woven fabric may form a side edge with respect to the conductive plating surface on which the sensing responses are not generated. The side edge may be provided with a detector connected to a connector to transmit the sensing responses to the outside.

As an embodiment, the side edge may provide a connection portion through low-temperature soldering or riveting.

As an embodiment, the HOD pad may include a sensing pad and a guard pad, a polyethylene (PE) foam may be provided between the sensing pad and the guard pad to provide elasticity together with an insulation function of the conductive plating surface, the sensing pad may be bonded above the PE foam via an adhesive, and the guard pad may be bonded below the PE foam via the adhesive.

As an embodiment, the HOD pad may be surrounded by a leather cover. The leather cover may be patched to the HOD pad surrounding a steering wheel grip body constituting a steering wheel to form the steering wheel.

As an embodiment, the steering wheel grip body may be provided with a hot wire pad located below the HOD pad.

In accordance with an embodiment of the present disclosure, a method of forming a steering wheel HOD cover is provided. The method includes providing a HOD pad having a fabric made of a non-woven fabric or a foam sponge of a non-woven fabric and surface plating a conductive plating surface of the fabric on which sensing responses occur with respect to a contact state (hands ON) and a non-contact state (hands OFF) due to a physical contact.

As an embodiment, the surface plating may include surface plating nickel and copper on the conductive plating surface of the fabric.

As an embodiment, the surface plating of the nickel and the copper may be by precipitation plating of the copper followed by precipitation plating of the nickel.

As an embodiment, the precipitation plating may be performed by dipping the fabric into a nickel precipitator in which the nickel is contained and then dipping the fabric into a copper precipitator in which the copper is contained.

DESCRIPTION OF SPECIFIC EMBODIMENTS

Embodiments of the present disclosure are described below in more detail with reference to the accompanying drawings. These embodiments are examples of the present disclosure and may be embodied in various other different forms by those having ordinary skill in the art to which the present disclosure pertains. Thus, the present disclosure is not limited to these embodiments.

Figure 1:
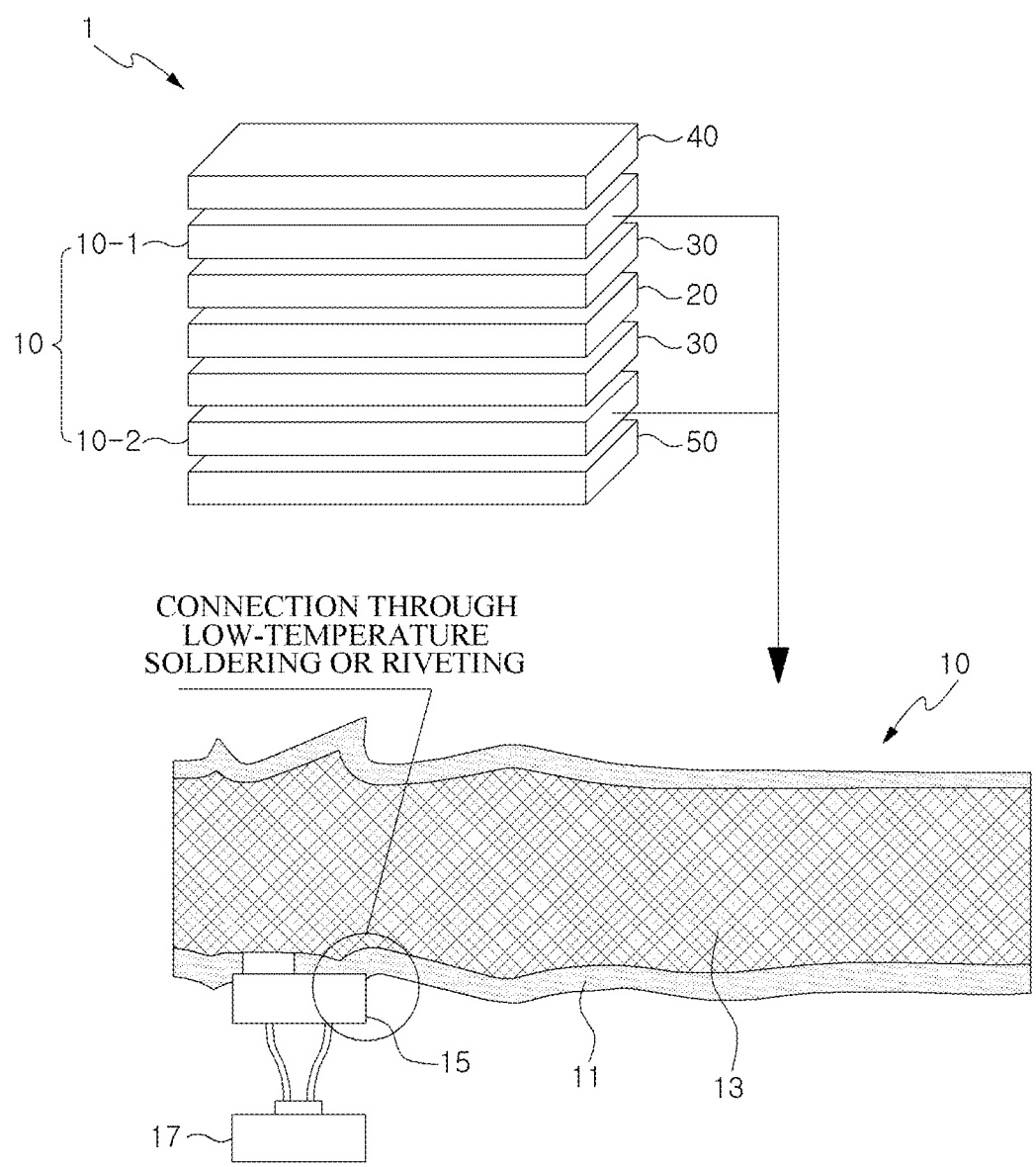
FIG. 1 is a configurational diagram illustrating a steering wheel hands off detection (HOD) cover according to the present disclosure.

FIG. 1 illustrates a conductive hands off detection (HOD) pad 10, which includes a fabric 11, a conductive plating surface 13, a connector 15, and a detector 17 and is applied to a steering wheel HOD cover 1.

For example, the fabric 11 is made of anon-woven fabric or a foam sponge of a non-woven fabric. Thus, the fabric 11 has a shape of the non-woven fabric or the foam sponge of a non-woven fabric, which forms the conductive plating surface 13. Therefore, the fabric 11 has high elongation, which is capable of solving a low elongation problem of the existing woven-type conductive fiber using a metal coating yarn in the form of the non-woven fabric or the foam sponge of a non-woven fabric.

Further, the fabric 11 forms a side edge on which the conductive plating surface 13 is not formed so as to provide the connector 15 to a connection portion while protecting the conductive plating surface 13. In this case, the side edge is formed so as to prevent formation of the conductive plating surface 13 on the fabric 11. Alternatively, after an entirety of the fabric 11 is formed as the conductive plating surface 13, in a state in which a line of the detector 17 is in contact with a side surface of the conductive plating surface 13, the side edge is provided as a portion at which the connector 15 or a separate non-woven fabric is connected through low-temperature soldering or riveting. In particular, lead-free soldering may be applied as the low-temperature soldering.

For example, the conductive plating surface 13 is made of a conductive material, which directly infiltrates into the fabric 11, thereby providing conductivity to the non-woven fabric or the foam sponge of a non-woven fabric. In particular, the conductive plating surface 13 is formed on the entirety of the fabric 11 or on a portion except for the side edge of the fabric 11. In this case, nickel and copper are applied as the conductive material. Therefore, the conductive plating surface 13 generates a sensing response with respect to a physical contact state (hands ON) and a physical non-contact state (hands OFF) of the outside of the fabric 11 (e.g., a driver).

For example, the connector 15 is coupled to the side edge of the fabric 11 to be integrated with the fabric 11 such that the detector 17 is connected to the conductive plating surface 13. In this case, the connector 15 is connected to two lines drawn out from the detector 17. The detector 17 is connected to the connector 15 to generate the sensing responses of the conductive plating surface 13 as electrical signals.

In particular, the two lines connected to one connector 15 are drawn out from the detector 17. One line of the two lines is connected from the connector 15 to a sensing pad 10-1, and the other line thereof is connected from the connector 15 to a guard pad 10-2. Therefore, the two lines connected to the sensing and guard pads 10-1 and 10-2 are connected to an autonomous driving controller for controlling autonomous driving. Thereby, a stable electrical connection and stable electrical signal transmission are made between the connector 15 and the detector 17, which provides the electrical signals according to the sensing responses.

Referring to FIG. 1 again, the steering wheel HOD cover 1 includes the HOD pad 10 divided into the sensing pad 10-1 and the guard pad 10-2, a polyethylene (PE) foam 20, an adhesive 30, a leather cover 40, and a hot wire pad 50.

For example, the sensing and guard pads 10-1 and 10-2 are formed to be the same as each other by including the fabric 11, the conductive plating surface 13, the connector 15, and the detector 17 as components. Thus, the sensing pad 10-1 and the guard pad 10-2 are merely names for distinguishing the HOD pad 10 according to the quantity of use of the HOD pad 10.

For example, the PE foam 20 provides elasticity to the steering wheel HOD cover 1 to improve a grip feel of the driver. In particular, the PE foam 20 is located between the sensing pad 10-1 and the guard pad 10-2 to additionally implement an isolation function of separating a current. This separation prevents a shock, which may be generated due to current flow when the sensing pad 10-1 is in contact with the guard pad 10-2.

For example, the adhesive 30 bonds the PE foam 20 to the sensing pad 10-1 above the PE foam 20 and bonds the PE foam 20 to the guard pad 10-2 below the PE foam 20 such that each of the sensing and guard pads 10-1 and 10-2 is fixed with the PE foam 20. The leather cover 40 is patched, i.e., attached above the sensing pad 10-1 and forms an exterior appearance of the steering wheel HOD cover 1 to provide the grip feel of the driver.

For example, the hot wire pad 50 is located below the guard pad 10-2, is surrounded with the leather cover 40, and has a heating wire for irradiating heat by receiving an external power supply. Therefore, the hot wire pad 50 heats the steering wheel HOD cover 1 at an appropriate temperature in winter conditions.

Figure 2:
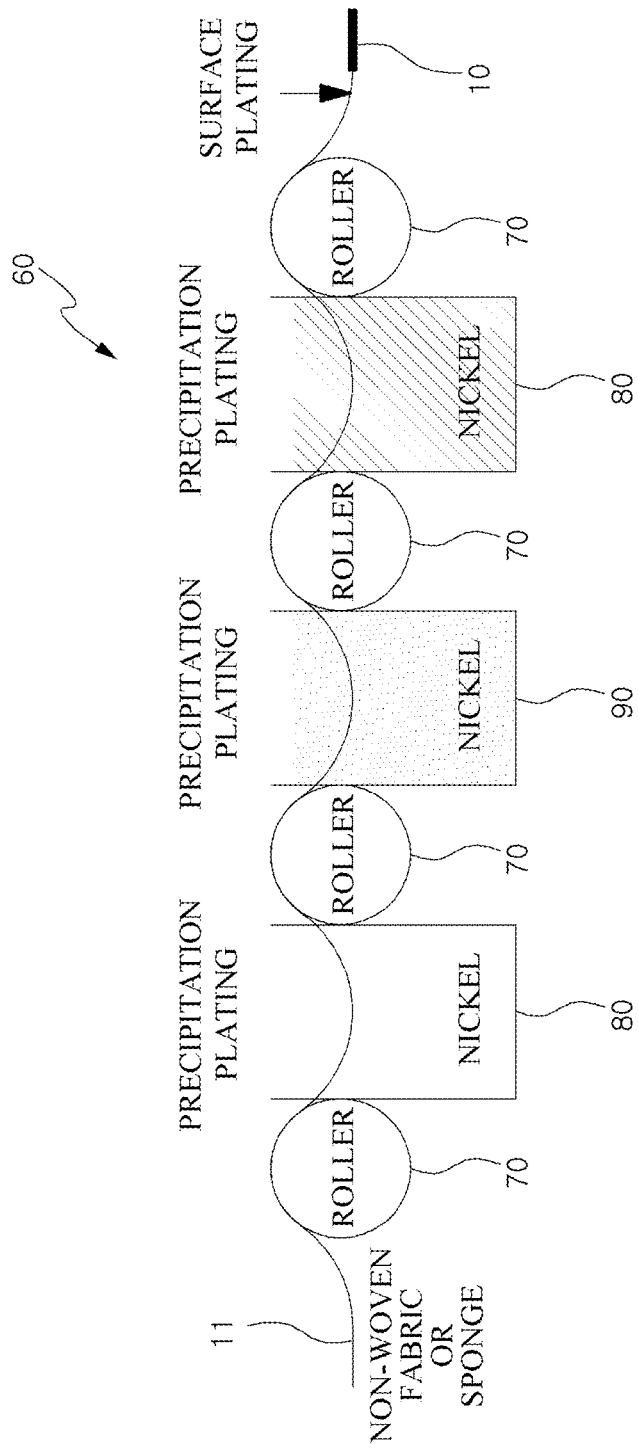
FIG. 2 is a diagram illustrating an example of a conductive plating process of a conductive non-woven fabric or a conductive foam sponge of a non-woven fabric, which is applied to an HOD pad of the steering wheel HOD cover according to the present disclosure.

FIG. 2 illustrates a conductive plating process of the HOD pad 10. As shown in the drawing, conductive plating equipment 60 includes a roller 70, which rotates, nickel precipitators 80 in which nickel is contained or dissolved, and a copper precipitator 90 in which copper is contained or dissolved.

A plating process of the HOD pad 10 is performed using the conductive plating equipment 60. The fabric 11 made of a non-woven fabric or a foam sponge of a non-woven fabric is put on the roller 70. The roller 70 rotates to dip the fabric 11 into each of the nickel precipitators 80 and the copper precipitator 90, which are sequentially located in a transfer direction of the fabric 11.

In this case, the surface plating of nickel and copper may not be formed on a surface of the fabric 11. However, after the surface plating of nickel and copper is formed on the side edge, the connector 15 or a separate non-woven fabric is patched on the fabric 11 using the low-temperature soldering or a riveting connection such that convenience of the plating process may be achieved.

Then, unlike the woven-type conductive fiber using the existing metal coating yarn, the HOD pad 10 is manufactured of the fabric 11 formed of the non-woven fabric or the foam sponge of a non-woven fabric, which forms the conductive plating surface 13 that is surface plated with nickel and copper. In particular, the conductive plating surface 13 is formed through precipitation plating of nickel, copper, and then nickel.

Figure 3:
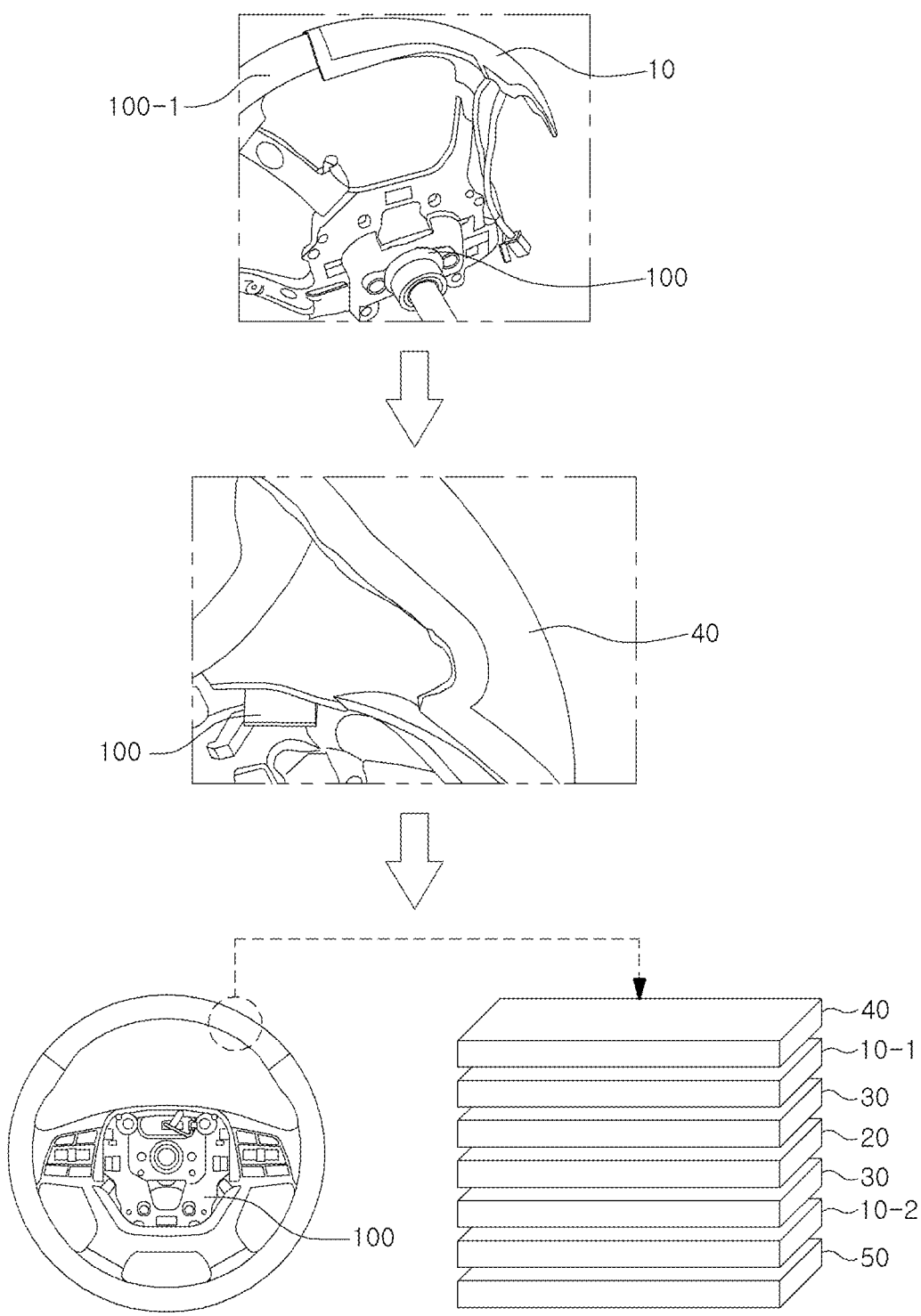
FIG. 3 is a diagram illustrating an example of an assembly process of the steering wheel HOD cover using the HOD pad to which the conductive non-woven fabric or the conductive foam sponge of a non-woven fabric according to the present disclosure is applied.

FIG. 3 illustrates an assembling process of the steering wheel HOD cover 1 to which the HOD pad 10 is applied by pairing the sensing and guard pads 10-1 and 10-2.

In this case, in a process of assembling the steering wheel HOD cover 1, it is characterized by using the sensing and guard pads 10-1 and 10-2 having high elongation, which are advantageous to prevent wrinkles in the formation of the leather cover 40. Thus, a description of a process of assembling the PE foam 20, the adhesive 30, and the hot wire pad 50 has been omitted herein. Further, since the sensing and guard pads 10-1 and 10-2 have the same characteristic, the sensing and guard pads 10-1 and 10-2 are described herein as HOD pad 10.

As shown in the drawing, the HOD pad 10 is attached to a steering wheel grip body 100-1 while surrounding the steering wheel grip body 100-1 according to a shape of the steering wheel grip body 100-1 of a steering wheel 100. In this case, as compared to a woven-type conductive fiber using the existing metal coating yarn and owing to the non-woven fabric or the foam sponge of a non-woven fabric having high elongation, the HOD pad 10 does not form wrinkles. Such wrinkles are otherwise generated by a woven textile in a process of surrounding the steering wheel grip body 100-1. Thus, the leather cover 40 may be completed without forming wrinkles in a process of assembling the leather cover 40 subsequent to a process of assembling the HOD pad 10.

Consequently, after the assembly process of the steering wheel grip body 100-1 is completed, the steering wheel HOD cover 1 applied to the steering wheel 100 includes the sensing and guard pads 10-1 and 10-2, the PE foam 20, the adhesive 30, the leather cover 40, and the hot wire pad 50 as components. The leather cover 40 in such a steering wheel HOD cover 1 does not form wrinkles.

The disclosed process may solve an increased process cost problem, which would occur when the wheel cover assembly process is changed so as to prevent wrinkles being formed in the steering wheel HOD cover 1.

As described above, the steering wheel HOD cover 1 according to the present embodiment includes the HOD pad 10 having the fabric 11 made of the non-woven fabric or the foam sponge of a non-woven fabric. The steering wheel HOD cover 1 is formed by surface plating the conductive plating surface 13 on which the sensing responses occur with respect to the contact state (hands ON) and the non-contact state (hands OFF) due to physical contact. Thus, high elongation is possible as compared to elongation, which is insufficient in a conductive fiber. In particular, as compared to a woven-type conductive fiber using the existing metal coating yarn, it is possible to reduce production cost by maintaining the assembly process because wrinkles are not formed on a surface of a leather in the process of assembling the leather cover on the HOD pad using high elongation of the non-woven fabric or the foam sponge of a non-woven fabric.

The steering wheel HOD cover of the present disclosure implements the following actions and effects by solving the lack of elongation of the HOD pad.

First, the existing problem of a lack of elongation of the HOD pad due to a woven-type conductive fiber using a metal coating yarn is solved by applying a non-woven fabric. Second, the non-woven fabric or the foam sponge of a non-woven fabric is used to improve the elongation of the HOD pad such that the material is not limited, and manufacturing cost can be significantly reduced. Third, nickel and copper are directly applied in the conductive plating of the non-woven fabric or the foam sponge of a non-woven fabric such that productivity can be significantly increased. Fourth, a conductive non-woven fabric or a conductive foam sponge of a non-woven fabric is used such that it is possible to secure a technological advantage and a preemptive market share in the autonomous vehicle market in which the demand for HOD pads is increasing.

While the present disclosure has been described with respect to the specific embodiments, it should be apparent to those having ordinary skill in the art that various changes and modifications may be made without departing from the spirit and scope of the present disclosure as defined in the following claims. Accordingly, it should be noted that such alternations or modifications fall within the claims of the present disclosure. The scope of the present disclosure should be construed on the basis of the appended claims.

What is claimed is:

1. A steering wheel hands off detection (HOD) cover, comprising:
    a HOD pad having a fabric made of a non-woven fabric or a foam sponge of a non-woven fabric, the fabric having a conductive plating surface that is surface plated and on which sensing responses occur with respect to a contact state (hands ON) and a non-contact state (hands OFF) due to a physical contact,
    wherein the HOD pad includes a sensing pad and a guard pad, and
    wherein a polyethylene (PE) foam is provided between the sensing pad and the guard pad to provide elasticity together with an insulation function of the conductive plating surface.

2. The steering wheel HOD cover of claim 1, wherein the conductive plating surface is surface plated with nickel and copper.

3. The steering wheel HOD cover of claim 2, wherein the nickel and the copper are surface plated on the fabric by precipitation plating of the copper followed by precipitation plating of the nickel.

4. The steering wheel HOD cover of claim 3, wherein the precipitation plating is formed by the fabric being dipped into a nickel precipitator in which the nickel is contained and then dipped into a copper precipitator in which the copper is contained.

5. The steering wheel HOD cover of claim 1, wherein:
the non-woven fabric forms a side edge with respect to the conductive plating surface; and
the sensing responses are not generated on the side edge.

6. The steering wheel HOD cover of claim 5, wherein:
a detector connected to a connector is provided on the side edge; and
the detector transmits the sensing responses to the outside.

7. The steering wheel HOD cover of claim 5, wherein the side edge provides a connection portion through low-temperature soldering or riveting.

8. The steering wheel HOD cover of claim 1, wherein:
the sensing pad is provided above the PE foam; and
the guard pad is provided below the PE foam.

9. The steering wheel HOD cover of claim 1, wherein the HOD pad is surrounded by a leather cover.

10. The steering wheel HOD cover of claim 9, wherein:
the leather cover surrounds a steering wheel grip body; and
the steering wheel grip body is formed as a steering wheel.

11. The steering wheel HOD cover of claim 10, wherein the leather cover is attached to the HOD pad surrounding the steering wheel grip body.

12. The steering wheel HOD cover of claim 10, wherein a hot wire pad is provided on the steering wheel grip body.

13. The steering wheel HOD cover of claim 12, wherein the hot wire pad is located below the HOD pad.

14. A method of forming a steering wheel hands off detection (HOD) cover, the method comprising:
providing a HOD pad having a fabric made of a non-woven fabric or a foam sponge of a non-woven fabric; and
surface plating a conductive plating surface of the fabric on which sensing responses occur with respect to a contact state (hands ON) and a non-contact state (hands OFF) due to a physical contact,
wherein the surface plating includes surface plating nickel and copper on the conductive plating surface of the fabric,
wherein the surface plating of the nickel and the copper are by precipitation plating of the copper followed by precipitation plating of the nickel, and
wherein the precipitation plating is performed by dipping the fabric into a nickel precipitator in which the nickel is contained and then dipping the fabric into a copper precipitator in which the copper is contained.

15. A steering wheel hands off detection (HOD) cover, comprising:
a HOD pad having a fabric made of a non-woven fabric or a foam sponge of a non-woven fabric, the fabric having a conductive plating surface that is surface plated and on which sensing responses occur with respect to a contact state (hands ON) and a non-contact state (hands OFF) due to a physical contact, wherein a detector connected to a connector is provided on the side edge and the detector transmits the sensing responses to the outside.

* * * * *